J. B. DAVIS.
COMBINED SEPTIC TANK AND PRIVY.
APPLICATION FILED SEPT. 5, 1916.
1,281,528.
Patented Oct. 15, 1918.
2 SHEETS—SHEET 1.
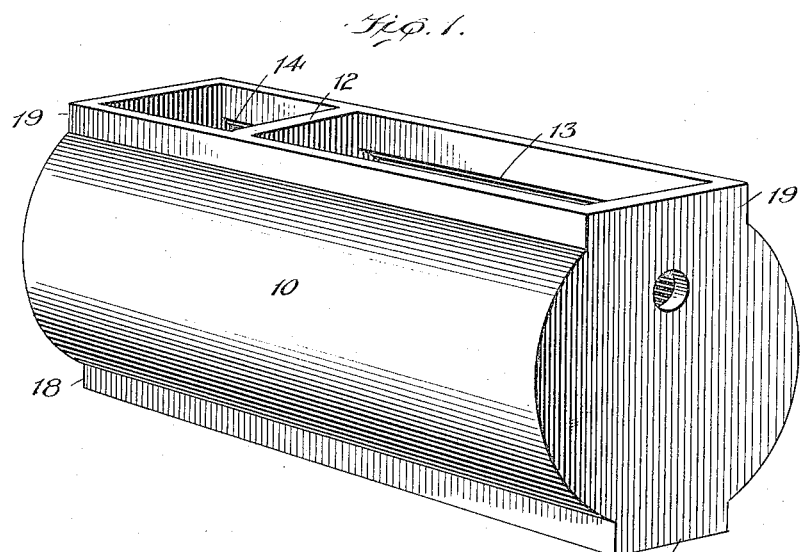
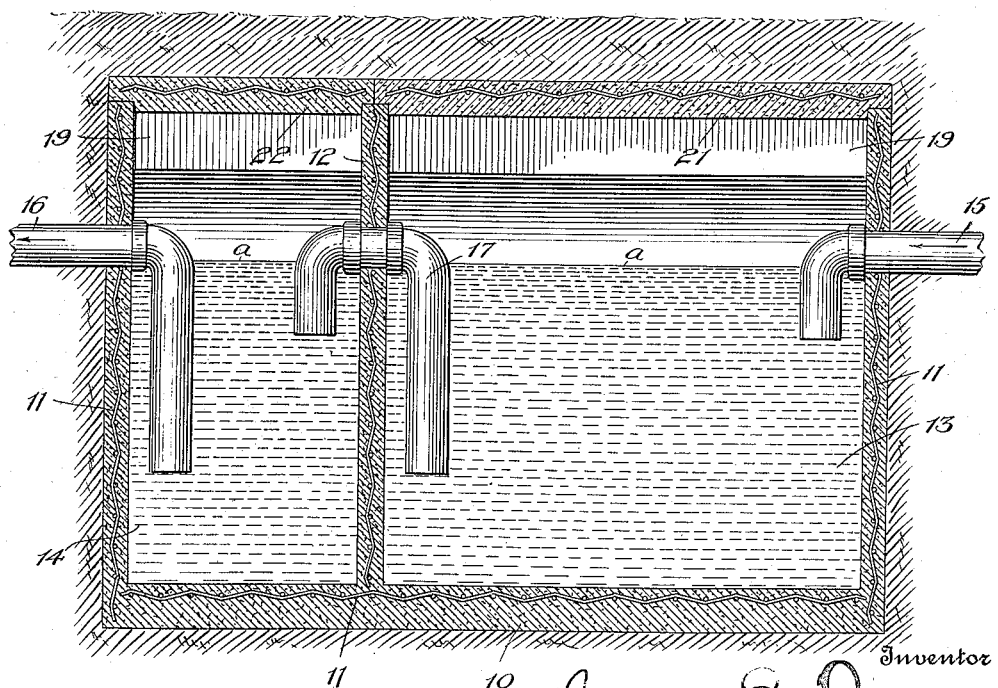

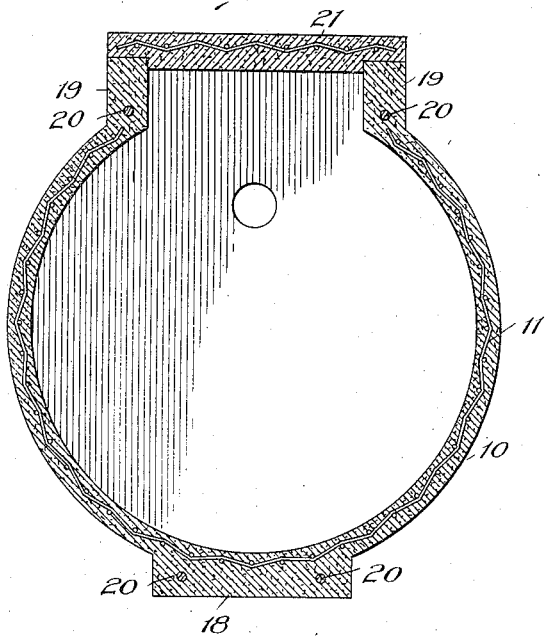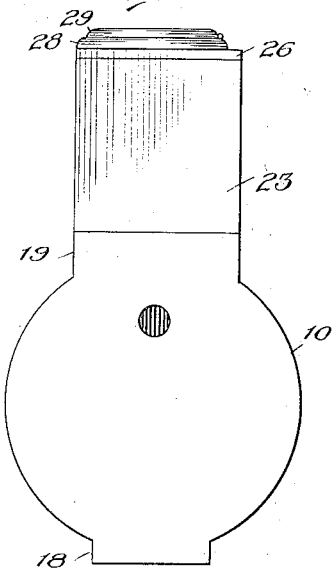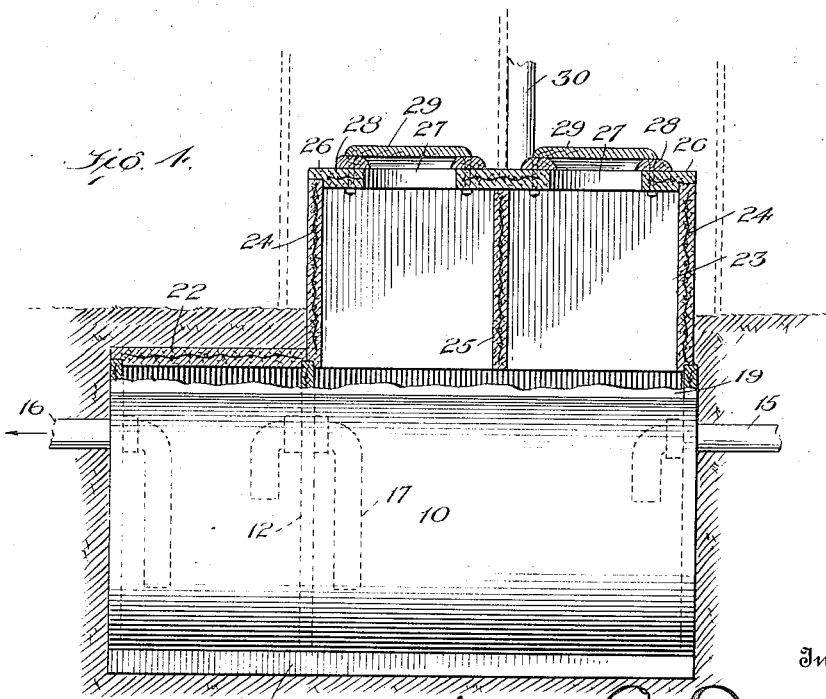

UNITED STATES PATENT OFFICE.

JAMES B. DAVIS, OF WILMINGTON, NORTH CAROLINA, ASSIGNOR, BY DIRECT AND MESNE ASSIGNMENTS, TO STANDARD CEMENT CONSTRUCTION COMPANY, OF WILMINGTON, NORTH CAROLINA, A CORPORATION OF NORTH CAROLINA.

COMBINED SEPTIC TANK AND PRIVY.

1,281,528.   Specification of Letters Patent.   Patented Oct. 15, 1918.

Application filed September 5, 1916.   Serial No. 118,383.

*To all whom it may concern:*

Be it known that I, JAMES B. DAVIS, a citizen of the United States, residing at Wilmington, in the county of New Hanover and State of North Carolina, have invented certain new and useful Improvements in Combined Septic Tanks and Privies; and I do hereby declare the following to be a full, clear, and exact description of the invention, such as will enable others skilled in the art to which it appertains to make and use the same.

My invention relates to water purification systems, but has reference more particularly to systems and apparatus, including a septic tank, for the safe disposal of human excreta at unsewered homes and places of abode.

It has for an object the production of apparatus which is admirably adapted to serve as a septic tank for community use, and which may be readily converted into a privy for individual or family use, provision being made in any event for the proper fermentation and liquefication within said tank of fecal matter deposited therein, for supplying water thereto, and for automatically delivering same into a suitable effluent tank or compartment preparatory to its discharge through suitable pipes leading to a sewer farm or other place of final disposal.

A further object of this invention is the formation by molding or otherwise, of a septic or liquefying, and an effluent tank in one unitary structure having certain characteristics hereinafter described, and in the provision of means whereby such structure may be readily converted from a septic tank for community use to an individual privy if desired, or be arranged for use as both a common septic tank and privy at one and the same time.

A further object of the present invention is the production of portable reinforced concrete septic tanks and privy equipments, which may if desired be advantageously molded and finished at the factory preparatory to shipment, for installation in sections, either as a community tank, an individual privy, or both at one and the same time.

With the foregoing and other objects in view the present invention will now be particularly described and thereafter set forth by the appended claims.

In the accompanying drawings which form part of this application for letters patent, and whereon like reference characters indicate corresponding parts wherever they appear in the several views:

Figure 1 is a perspective view of a unitary two-compartment cast or molded septic tank with covers removed.

Fig. 2 is a longitudinal central section through a buried reinforced-concrete septic tank with inlet, outlet and syphon pipes in position for use as a community tank.

Fig. 3 is a transverse vertical section taken through such a tank as illustrated by Figs. 1 and 2.

Fig. 4 is a side elevation of a buried septic tank broken away at its upper portion, and surmounted by a coöperative arrangement of privy seats, the latter being shown in vertical section, and, Fig. 5 is an end view of combined septic tank and privy attachment such as indicated by Fig. 4.

Reference being had to the drawings and numerals thereon, 10 indicates a septic tank of unitary construction, preferably molded of concrete in substantially cylindrical form, reinforced by expanded metal or other suitable reinforcing material 11, and crossed transversely by a partition 12 of like material and construction, dividing the tank into liquefying and effluent compartments 13 and 14 respectively, of approved proportions.

Tank 10 is provided at one end with the usual downturned inlet pipe 15 by agency of which sewage may be gathered from one or many sources, and delivered into the liquefying compartment 13 below the normal water level *a* thereof. The opposite end of tank 10 is similarly provided with an outlet or discharge pipe 16 having a downturned inner end extending to a point intermediate the bottom of the effluent compartment 14 and its normal water level *a*; while the partition 12 is similarly equipped with a siphon pipe 17 having an intake extending well below the water line *a* and above the bottom of liquefying compartment 13; and also a shorter outlet similarly located with reference to the water line and bottom of the effluent compartment 14.

The foregoing arrangement of inlet, siphon and outlet pipes are of well known construction and arrangement, and therefore constitutes no part of the present invention in themselves. As is well understood by persons familiar with the art to which the present invention relates the function of said pipes, and the compartments with which they communicate, is the delivery of sewage and fecal matter into the liquefying compartment 13 at a point below the normal level of liquids therein, and above the bottom of said compartment, so as to prevent interference with the accumulated sludge on the compartment bottom or scum upon the surface of its liquid contents. A further object is that of retarding fecal matter in its passage through compartment 13 until there has been ample time for it to ferment and gradually liquefy. A further object is that of occasionally raising the liquid level in compartment 13 causing the resultant effluent therein to be siphoned or drawn off into the effluent compartment 14, and thence by outlet pipe 16 to suitable open-joint drain pipes and laterals (not shown) beneath the surface of a sewer farm or disposal grounds.

In carrying out the aforesaid well recognized septic process, whether in connection with a community septic tank as shown by Fig. 2, or the same surmounted directly by a privy equipment substantially such as indicated by Figs. 4 and 5, it will be noted that the tank 10 is especially formed and constructed with a novel form of rectangular base 18 and surrounding top flange 19, both additionally reinforced by means of longitudinal tie rods 20 running from end to end thereof.

The said base 18 has been found in practice to greatly facilitate installation of the portable tanks 10. It not only prevents rolling of the otherwise cylindrical structure during transportation and manipulation prior to installation, but when lowered into an excavation insures the proper rectilinear or perpendicular arrangement of the entire structure and superstructure.

The said top flange 19 as best shown by Fig. 1, is continuous and in one common plane for the purpose of affording a smooth and unbroken air-tight and water-tight foundation for covers 21 and 22, serving as closures for the compartments 13 and 14, respectively, as shown by Figs. 2 and 3; or for the superimposed correspondingly flanged lower edges of the privy box 23, as indicated by Figs. 4 and 5.

Preferably the said box 23 is also molded of concrete or similar material, in rectangular form, is reinforced as at 24, is provided with one or more integral transverse partitions 25, and is flanged at its base to mate with the top flange 19 of tank 10.

Over the otherwise open upper end of said box 23 is placed a suitably flanged top 26, likewise of concrete, and suitably perforated at one or more points as at 27, the said perforations or openings 27 being surrounded and surmounted by closet seats 28, and hinged covers 29 of ordinary construction. Communicating with the interior of box 23 there may also be provided a vertical vent pipe 30, while surrounding the whole there is the customary side walls, indicated by dotted lines, and such housing as may be necessary for privacy.

In the construction of my improved portable and convertible septic tank and privy equipment, preference is given to reinforced concrete as the material employed, but obviously any other suitable material may be substituted without departing in the least from the spirit of my invention. It will be noted, however, that when concrete is employed as the basic material, care must be exercised to prevent mutilation of the tank top-flange 19, and its mating surfaces. If these become broken in the course of shipment or installation, obviously the efficiency of the entire structure is seriously impaired, and for this reason, among others, the relatively broad rectangular base 18 is provided for the bottom of tank 10.

It will be noted also that the raised surrounding top flange 19 is a structural feature of great importance, in so far as it makes possible the use of flat closures of considerable breadth even though the body of the tank is of cylindrical form, and provides a stable and practical means of mounting the box member 23 which could not be properly mounted upon a cylindrical surface.

Having thus described my invention, what I now claim and desire to secure by Letters Patent is:

1. As a unitary article of manufacture a septic tank of substantially cylindrical form having a downwardly projecting relatively thickened flat base of a width less than the diameter of the tank and of a length equal thereto, and a top opening in vertical alinement with the sides and ends of said base, the said opening being surrounded by a continuous upstanding flange constituting the support for a removable cover.

2. As a unitary article of manufacture a septic tank of substantially cylindrical form having a downwardly projecting relatively thickened flat base of a width less than the diameter of the tank and of a length equal thereto, a transverse partition located intermediate the ends of said tank and having an opening therein near the top thereof, top openings in vertical alinement with the sides and ends of said base, and an upstanding flange surrounding said top openings constituting a support for removable covers.

3. A septic tank comprising a longitudinally cylindrical hollow body portion having an opening therein, a supporting base for said tank including a downwardly projecting relatively thickened flat base of a width less than the diameter of the said body portion and of a length equal to the length of the tank, an upwardly projecting wall of rectangular formation surrounding the opening in said tank, a transverse partition intermediate the length of the tank designed to extend upwardly to the uppermost edge of the surrounding rectangular wall and provided with an opening near the top thereof, and end walls for said tank.

In testimony whereof I affix my signature in presence of two subscribing witnesses.

JAMES B. DAVIS.

Witnesses:
W. G. JAMES,
H. M. OWEN.